US012727973B2

(12) United States Patent
Keles et al.

(10) Patent No.: US 12,727,973 B2
(45) Date of Patent: Sep. 8, 2026

(54) ORTHODONTIC PALATAL AND JAW EXPANSION DEVICE

(71) Applicant: AEGIS STAR DENTAL TECHNOLOGIES INC., Boston, MA (US)

(72) Inventors: Eren Ahmet Keles, Istanbul (TR); Ahmet Ozlem Keles, Istanbul (TR)

(73) Assignee: AEGIS STAR DENTAL TECHNOLOGIES INC., Boston, MA (US)

( * ) Notice: Subject to any disclaimer, the term of this patent is extended or adjusted under 35 U.S.C. 154(b) by 0 days.

(21) Appl. No.: 18/851,466

(22) PCT Filed: Mar. 29, 2023

(86) PCT No.: PCT/TR2023/050301
§ 371 (c)(1),
(2) Date: Sep. 26, 2024

(87) PCT Pub. No.: WO2023/191758
PCT Pub. Date: Oct. 5, 2023

(65) Prior Publication Data

US 2025/0221797 A1 Jul. 10, 2025

(30) Foreign Application Priority Data

Mar. 30, 2022 (TR) .............................. 2022/004907

(51) Int. Cl.
*A61C 7/10* (2006.01)

(52) U.S. Cl.
CPC .................................... *A61C 7/10* (2013.01)

(58) Field of Classification Search
CPC ................................................ A61C 7/06–36
See application file for complete search history.

(56) References Cited

U.S. PATENT DOCUMENTS 7,074,036 B1 7/2006 Keles
7,780,445 B2 8/2010 Keles
(Continued)

FOREIGN PATENT DOCUMENTS

EP 2155104 A1 2/2010
KR 20090120895 A 11/2009
(Continued)

OTHER PUBLICATIONS

International Preliminary Report on Patentability for PCT/TR2023/050301 dated Jun. 19, 2024, 15 pages.
(Continued)

*Primary Examiner* — Edelmira Bosques
*Assistant Examiner* — Matthew P Saunders
(74) *Attorney, Agent, or Firm* — NIXON & VANDERHYE

(57) ABSTRACT

The present invention relates to a palatal and jaw expansion device (1) comprising at least one screw (2), at least two blocks (4) that are positioned on the screw (2) so as to move on the screw (2), at least one stabilization rod (3) whereon the blocks 10 (4) are seated, a movement mechanism (5) disposed at the center of the screw (2) and an arm (6) that has a fixed end (8) fixed to the movement mechanism (5) perpendicularly to the horizontal axis where the screw (2) extends; when force is applied on the free end (7), it rotates the movement mechanism (5) whereon the arm (6) is fixed
(Continued)

and the screw (2) around the horizontal axis where the screw (2) extends, 15 enabling the blocks (4) to move on the screw (2).

15 Claims, 6 Drawing Sheets

(56) References Cited

U.S. PATENT DOCUMENTS 10,842,596 B2 * 11/2020 Ozlem Keles ........... A61C 7/10
2002/0142259 A1 * 10/2002 Ceppatelli ................ A61C 7/10 433/7
2003/0207225 A1 * 11/2003 Huge ....................... A61C 7/10 433/7
2007/0218416 A1 * 9/2007 Keles ....................... A61C 7/10 433/7
2007/0275341 A1 * 11/2007 Hanks ...................... A61C 7/10 433/7
2009/0081602 A1 * 3/2009 Ayan .................. A61B 17/8872 433/7
2010/0112507 A1 * 5/2010 Ehrenberger ............ A61C 7/10 433/7
2015/0056566 A1 * 2/2015 Moon ...................... A61C 7/10 433/7
2016/0008098 A1 * 1/2016 Dolfi ........................ A61C 7/10 433/7
2016/0022382 A1 * 1/2016 Montalban ............... A61C 7/10 433/7
2019/0125495 A1 * 5/2019 Ozlem Keles ........... A61C 7/10

FOREIGN PATENT DOCUMENTS

WO 03071976 A1 9/2003
WO 2008141314 A1 11/2008

OTHER PUBLICATIONS

International Search Report for PCT/TR2023/050301 dated Jun. 28, 2023, 3 pages.
Written Opinion of the ISA for PCT/TR2023/050301 dated Jun. 28, 2023, 6 pages.
Search Report, issued in Turkish Patent Application No. 2022/004907 dated May 5, 2023.

* cited by examiner

ORTHODONTIC PALATAL AND JAW EXPANSION DEVICE

This application is the U.S. national phase of International Application No. PCT/TR2023/050301 filed Mar. 29, 2023 which designated the U.S. and claims priority to TR Patent Application No. 2022/004907 filed Mar. 30, 2022, the entire contents of each of which are hereby incorporated by reference.

The present invention relates to a device used in orthodontic treatment, also called the palatal and jaw expansion device that can be easily attached to and detached from inside the mouth.

As it is known, the maxilla consists of two bones and there is a suture between these two bones. Thanks to this anatomical structure, the maxilla can be enlarged with palatal and jaw expansion devices. Use of palatal expansion devices in orthodontic treatments that provide proper alignment of crooked and badly positioned teeth in particular is known. In order to correct any crookedness and provide the space necessary for alignment of the teeth, the palatal and jaw expansion devices are placed in the palatal region between the bone structure and the molar teeth in the upper jaw palatal region and apply pressure on the teeth, providing movement of the upper jaw molar teeth toward the cheeks. Thus, the upper jaw expands and the arch perimeter where the teeth are aligned increases and space is provided for crooked teeth. Depending on the region from where support is taken, the palatal and jaw expansion devices are divided into three main segments as tooth-tissue-supported and/or bone-supported or hybrid support which takes support from both teeth and miniscrews.

The tooth-tissue-supported palatal and jaw expansion devices fulfill their function by receiving support from the teeth and/or the hard and/or soft tissues in the palatal region in order to expand the narrow jaws and move the molar and premolar teeth toward the cheeks. Thereby, in case of crookedness and jaw narrowness, the teeth are enabled to be aligned without tooth extraction and space is provided. The bone tissue-supported palatal expansion devices, on the other hand, are fixed by means of miniscrews or implants on the surface of the upper jaw palate.

In one of the state of the art embodiments, the blocks on the screw move by turning a pointed key in form of a needle around its own axis. In this type of palatal expansion devices, in order to expand the palate of the patient, he/she must fit the key accurately into the hole on the screw and turn the same around its own axis and remove the key when the procedure is completed. However, this procedure is quite difficult for the patient to do, so it is carried out by another person, and since the hole on the screw cannot be accessed when the operation of turning around the own axis cannot be properly carried out, the treatment process is disrupted, leading to greater problems. Another problem occurs in the case that the key with a pointed tip like a needle do not fit accurately into the screw hole while being inserted into the hole. In this case, the key may slip and puncture the palate, causing injury to the patient. The most important problem is that the patient may drop the key into his/her mouth while turning the screw, and there is the risk for the patient to swallow the key.

A state of the art embodiment is disclosed in U.S. Pat. No. 7,780,445. A palatal expansion device that is opened and closed by means of an arm which is moved by being slid along the screw is disclosed.

Another state of the art document is European Patent Application No. EP2155104. This document discloses a palatal expansion device comprising a crew having at least one activation arm.

The aim of the present invention is the realization of a palatal and jaw expansion device that can be easily attached to and detached from inside the mouth by the doctor, providing a comfortable use.

In order to attain the aim of this palatal and jaw expansion device, explicated in the first claim and the respective claims thereof, comprises a movement mechanism that moves the screw with the blocks by means of an arm serving as a lever, and a stronger, safer and more precise device is obtained by establishing a direct connection between the movement mechanism and the stabilization rod by means of the channel provided on the movement mechanism and the fitting of the protrusion provided on the stabilization rod into said channel. Thus, the same is also enabled to open more sensitively by means of the movement of the arm. For example, 0.2 mm opening is provided with one movement of the arm.

By means of the present invention, by means of the arm rotated around the horizontal axis where the screw extends, a palatal and jaw expansion device that is brought to open active or closed passive position only by pushing or pulling the arm is proposed.

By means of the gearwheels forming the movement mechanism and moving in a unidirectional manner, the blocks are enabled to move on the screw in a more precise, accurate and robust manner and are stopped in the desired position. Since the gearwheels can move in one direction, the blocks are prevented from moving backward on the screw and are enabled to maintain their present position.

Threads bored in opposite directions are provided on both sides of the screw. Thus, the blocks placed on both sides of the screws are enabled to move toward each other or away from each other at the same time. In the embodiment of the present invention, the blocks only move towards each other as the components are assembled.

A stabilization rod is disposed in parallel with the screw, allowing the blocks to move on the screw in a stabilized manner. The stabilization rod guides the movement of the blocks on the screw. Moreover, by means of the fitting of the protrusion into the channel provided on the movement mechanism, it is provided that the movement mechanism stays on the screw as a whole, thus preventing the sliding of the stabilization rod unilaterally, which is an unwanted event during the loosening process. Moreover, it is also provided that the screw and the stabilization rod stay together while the palatal and jaw expansion device shifts to the open or closed position.

The palatal and jaw expansion device can be attached to the teeth inside the mouth by means of retaining wires. Moreover, with the retaining wires the palatal and jaw expansion device can be fixed directly on the palate by means of miniscrews or implants. Moreover, it can be applied in a hybrid manner by taking support from both teeth and miniscrews. In all three embodiments, the working principle of the palatal and jaw expansion device is the same and it is enough to change the parts on the tip of the retaining wires.

In an embodiment of the present invention, a gradation, on which the protrusion on the stabilization rod and the first set are fitted in the closed position, is provided on the blocks. The depth of this gradation is at least as much as the thickness of the protrusion and the first set, and when fitted in the gradation, the protrusion and the first set flush the surface of the block facing the movement mechanism. Thus, the opening capacity is increased, without increasing the size of the palatal and jaw expansion device, and the blocks are enabled to move more on the stabilization rod In an embodiment of the present invention, the palatal and jaw expansion device comprises a first stopper which is provided on both ends of the stabilization rod, which keeps the components forming the palatal and jaw expansion device together and prevents the pieces from disassembling by locking them in place when it reaches maximum opening level by bearing the first stopper against the step inside the first hole that narrows the diameter of the first hole. Thus, the palatal and jaw expansion device in the patient's mouth is prevented from disassembling, and the patient is prevented from swallowing the components.

Moreover, the palatal and jaw expansion device comprises a second stopper which is provided on the second hole surface adjacent to the second set and the first set, which has a diameter larger than the diameter of the second hole, which does not have grooves thereon. Thus, when the palatal and jaw expansion device reaches the maximum opening level, the screw rotates freely in the grooveless second stopper, preventing the components forming the palatal and jaw expansion device from disassembling and falling into mouth of the patient. In an embodiment of the present invention, the first gearwheel and the arm are produced as a single piece. Thus, the risk of the arm breaking is minimized. By means of the present invention, by means of the pushing or pulling force applied with a finger on the arm, the palatal and jaw expansion device is enabled to be changed to the open active or passive position.

By means of the present invention, in the orthodontic treatments, a comfortable use of the palatal and jaw expansion device is provided to both the doctor and the patient, and the palatal and jaw expansion device can be attached easily and soundly without loss of time and detached when the upper jaw expansion treatment is completed. By means of the present invention, the palatal and jaw expansion device can be used quite practically by means of the arm. The patient can easily rotate the arm by himself/herself to change the palatal and jaw expansion device to the active or passive position. Since the movement mechanism is a unidirectional gear system, it can be wound like a jack and thus the arm goes loaded and returns empty. Moreover, by means of the present invention, the size can be provided quite small in comparison with other palatal and jaw expansion devices. Thus, the comfort of the patient is increased, allowing the patient to comfortably move his/her tongue. Moreover, the durability of the palatal and jaw expansion device is increased while ensuring a safer use.

A palatal and jaw expansion device realized in order to attain the aim of the present invention is illustrated in the attached figures, where:

Figure 1:
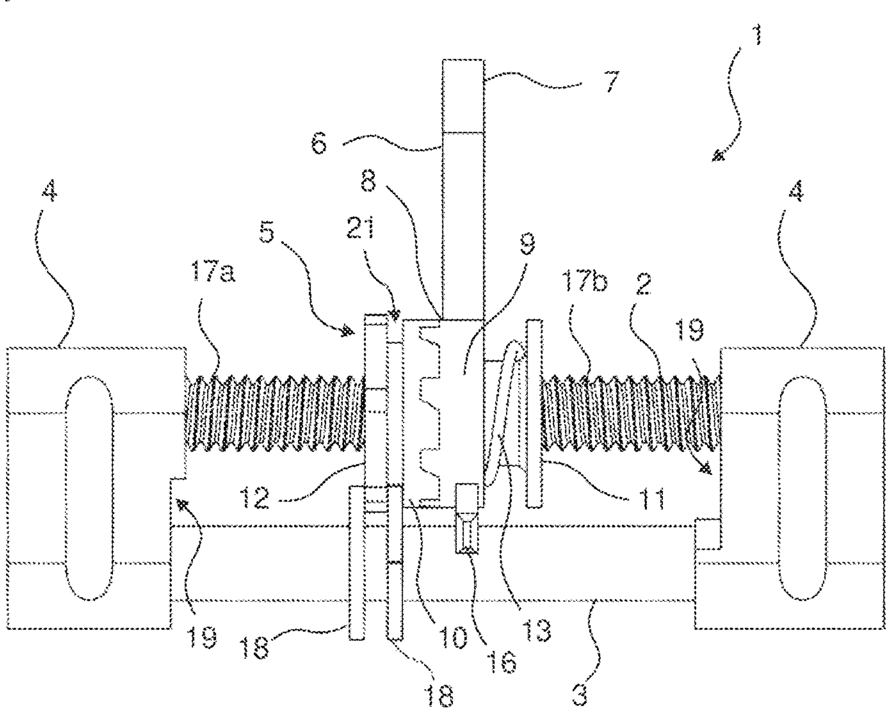
FIG. 1 is the view of a palatal and jaw expansion device in the open position.
Figure 2:
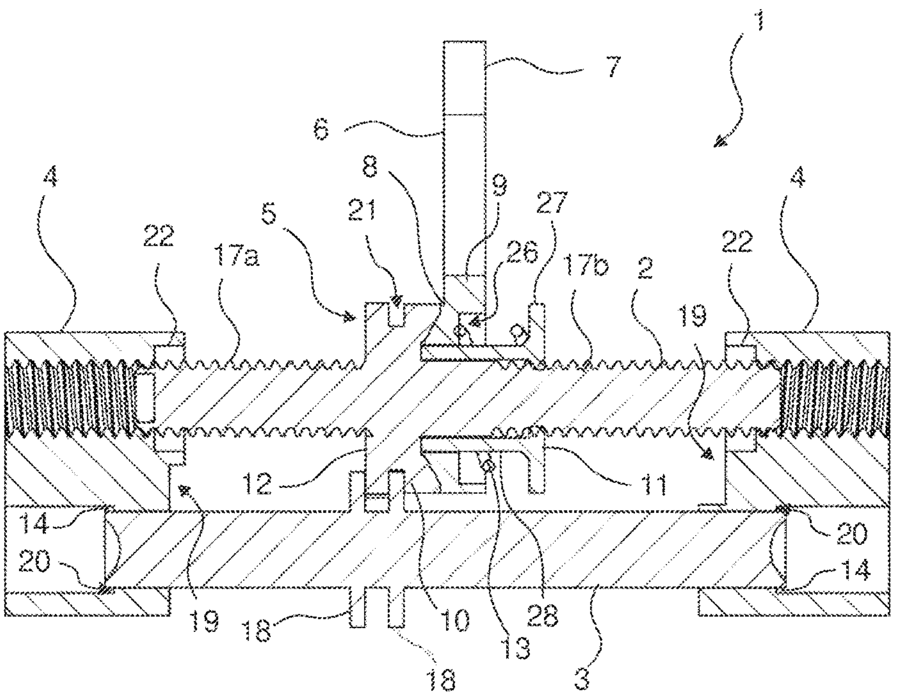
FIG. 2 is the cross-sectional view of FIG. 1.
Figure 3:
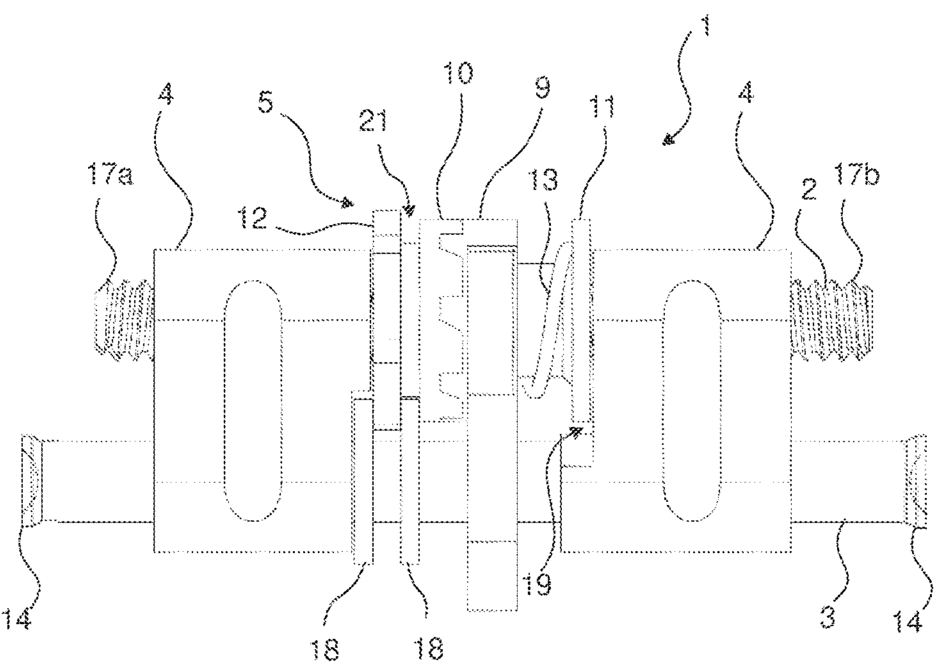
FIG. 3 is the view of the palatal and jaw expansion device in the closed position.
Figure 4:
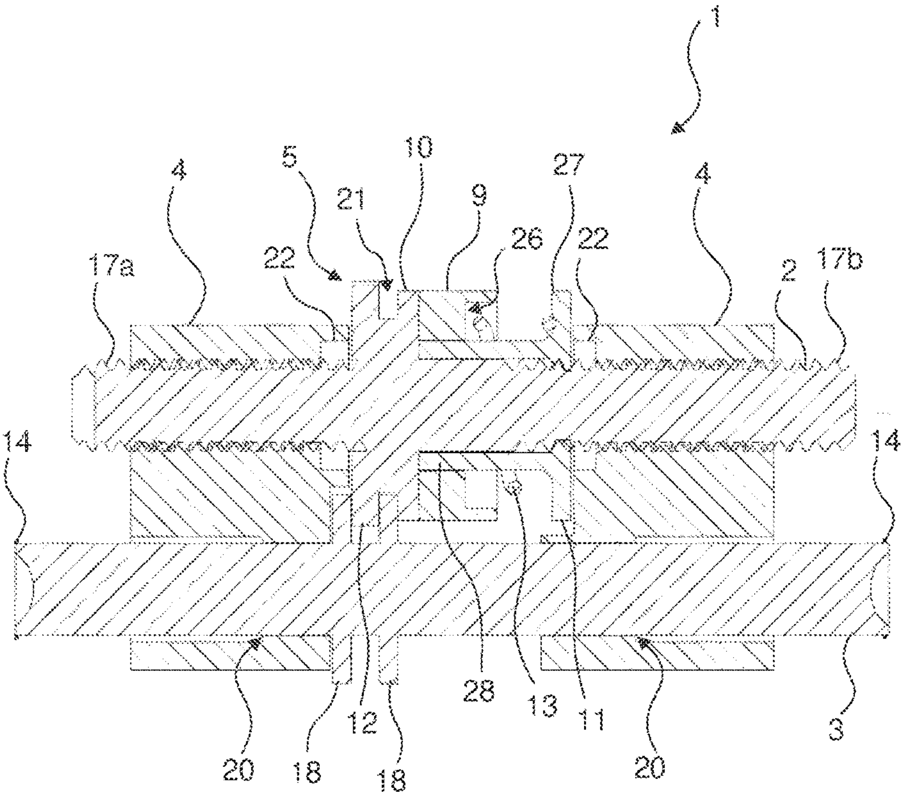
FIG. 4 is the cross-sectional view of FIG. 3.

1. Palatal and jaw expansion device
2. Screw
3. Stabilization rod
4. Block
5. Movement mechanism
6. Arm
7. Free end
8. Fixed end
9. First gearwheel
10. Second gearwheel
11. First set
12. Second set
13. Pushing member
14. First stopper
15. Retaining wires
16. Claw
17 *a*., 17 *b*. Screw threads
18. Protrusion
19. Gradation
20. Step
21. Channel
22. Second stopper
23. First hole
24. Second hole
25. Teeth
26. Housing
27. Headpiece
28. Pipe
29. Third stopper The palatal and jaw expansion device (1) comprises at least one screw (2); at least two blocks (4) that are positioned on the screw (2) so as to move on the screw (2); at least one stabilization rod (3) whereon the blocks (4) are seated; a movement mechanism (5) disposed at the center of the screw (2); an arm (6) that has a fixed end (8) fixed to the movement mechanism (5) perpendicularly to the horizontal axis where the screw (2) extends; when force is applied on the free end (7), it rotates the movement mechanism (5) whereon the arm (6) is fixed and the screw (2) around the horizontal axis where the screw (2) extends, enabling the blocks (4) to move on the screw (2); a first gearwheel (9) that is disposed on the movement mechanism (5), whereon teeth (25) in various profiles are bored, whereto the arm (6) is fixed and that rotates on the screw (2) around the horizontal axis by the movement of the arm (6); and a second gearwheel (10) that is fixed on the screw (2), that completely contacts the first gearwheel (9) so as to shift to the active position by the movement of the first gearwheel (9), and whereon teeth (25) in matching form with the teeth (25) on the first gearwheel (9) are bored.

This palatal and jaw expansion device (1) further comprises a first set (11) and a second set (12) that are disposed on the screw (2) and that limit the first and second gearwheels (9 and 10) from both sides; a channel (21) which is provided between the second set (12) and the second gearwheel (10); and two protrusions (18) which are oppositely provided on the stabilization rod (3), which extend towards the movement mechanism (5) and the screw (2), with one thereof being fitted into the channel (21) and the other remaining between the second set (12) and the block (4). The first and second gearwheels (9 and 10) are disposed between the first set (11) and the channel (21). The protrusions (18) on the stabilization rod (3) provide that the movement mechanism (5) to stay on the screw (2) as a whole, preventing the sliding of the stabilization rod (3) unilaterally, which is an unwanted event during the loosening process. In the embodiment of the present invention, while one protrusion (18) on the stabilization rod (3) is fitted into the channel (21), the second set (12) is positioned between the two protrusions (18). Thus, it is also provided that the screw (2) and the stabilization rod (3) stay together while the palatal and jaw expansion device (1) shifts to the open or closed position. In the preferred embodiment of the present invention, the distance between the two protrusions (18) is at least as much as the thickness of the second set (12). In this embodiment, the two protrusions (18) contact both surfaces of the washer-shaped second set (12) through which the screw (2) passes (FIG. 1, FIG. 2, FIG. 3 and FIG. 4). In an embodiment of the present invention, the second step (12) is preferably hexagonal. Thus, the second set (12) is enabled to be gripped and rotated when the movement is desired to be reversed.

The palatal and jaw expansion device (1) comprises at least one pushing member (13) between the first gearwheel (9) and the first set (11). In this embodiment, the first gearwheel (9) bears against the pushing member (13) disposed between the first set (11) and the first gearwheel (9).

The palatal and jaw expansion device (1) is placed inside the mouth by being attached to the palate (X) or the teeth (Y). The arm (6), when a force is applied thereon, functions as a lever and rotates the movement mechanism (5) whereto the fixed end (8) thereof is attached and the screw (2) whereon the movement mechanism (5) is positioned. The arm (6) is fixed perpendicularly to the horizontal axis where the screw (2) extends. The arm (6) is rotated not around its own axis but around the axis where the screw (2) extends. As a result of this rotating operation, the blocks (4) disposed on the screw (2) move on the screw (2) and reach the desired position. The arm (6) moves inside the mouth with an angle of approximately 90 degrees. The arm (6) makes a rotational movement of approximately 90 degrees between the closed position and the open position of the palatal and jaw expansion device (1) and in the closed position thereof inside the mouth the arm (6) stays almost parallel to the base without disturbing the patient. As the arm (6) is shifted from the open position to the closed position, the screw (2) does not wind backward and only the arm (6) and the first gearwheel (9) rotate idle. By means of the claw (16) on the first gearwheel (9), the arm (6) is enabled to be positioned in parallel with the floor and is prevented from moving further in an upward direction. The patient or the doctor can change the palatal and jaw expansion device (1) to the open or closed position by pushing or pulling the arm (6) only with a single finger movement. By means of the present invention, the palatal and jaw expansion device (1) can be changed to the open or closed position comfortably without using any additional tool, without the need for inserting any other tool inside the mouth.

Figure 7:
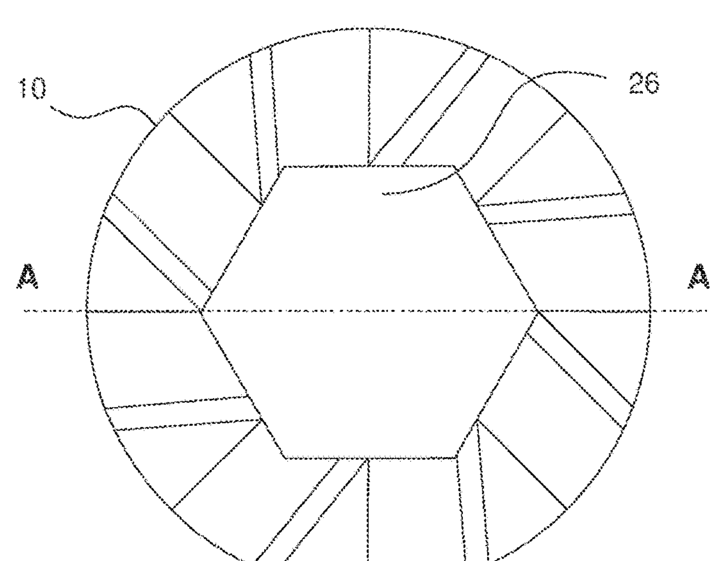
FIG. 7 is the top view of the second gearwheel.
Figure 8:
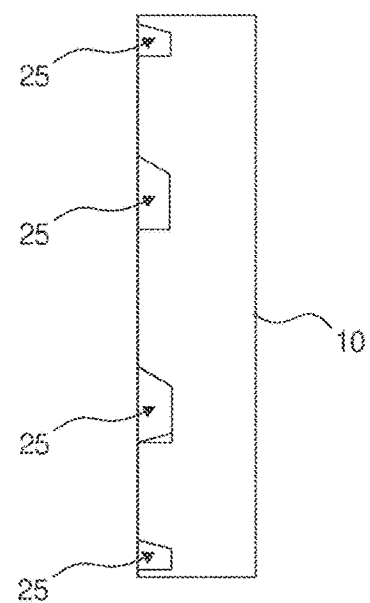
FIG. 8 is the sideways view of the second gearwheel.
Figure 9:
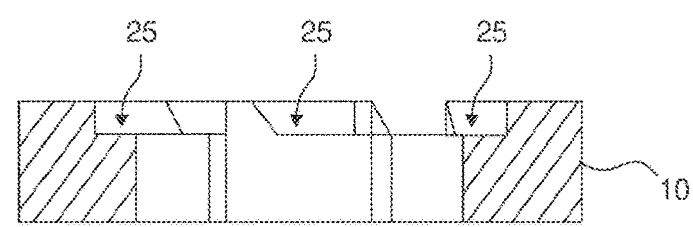
FIG. 9 is the view of the cross section A-A in FIG. 7.

In an embodiment of the present invention, the first and second gear wheels (9 and 10) comprise the teeth (25) that are preferably in the form of sawteeth (FIG. 7, FIG. 8 and FIG. 9).

In this embodiment of the present invention, when a force is applied externally on the free end (7) of the arm (6), the arm (6) rotates the first gearwheel (9) whereto the arm (6) is fixed and hence the second gearwheel (10); the teeth (25) of the second gearwheel (10) completely engage with the teeth (25) of the first gearwheel (9). As a result of the said rotational movement, the second gearwheel (10) fixed to the screw (2) rotates around the horizontal axis of the screw (2), thus enabling the blocks (4) thereon to move forward. The first and second gearwheels (9 and 10) operate in a unidirectional manner. Therefore, when the force applied on the arm (6) is removed and the arm (6) is moved backward to the original position, the first and second gearwheels (9 and 10) maintain their last positions. In this embodiment of the present invention, the arms (6) almost serve as a jackscrew.

Figure 6:
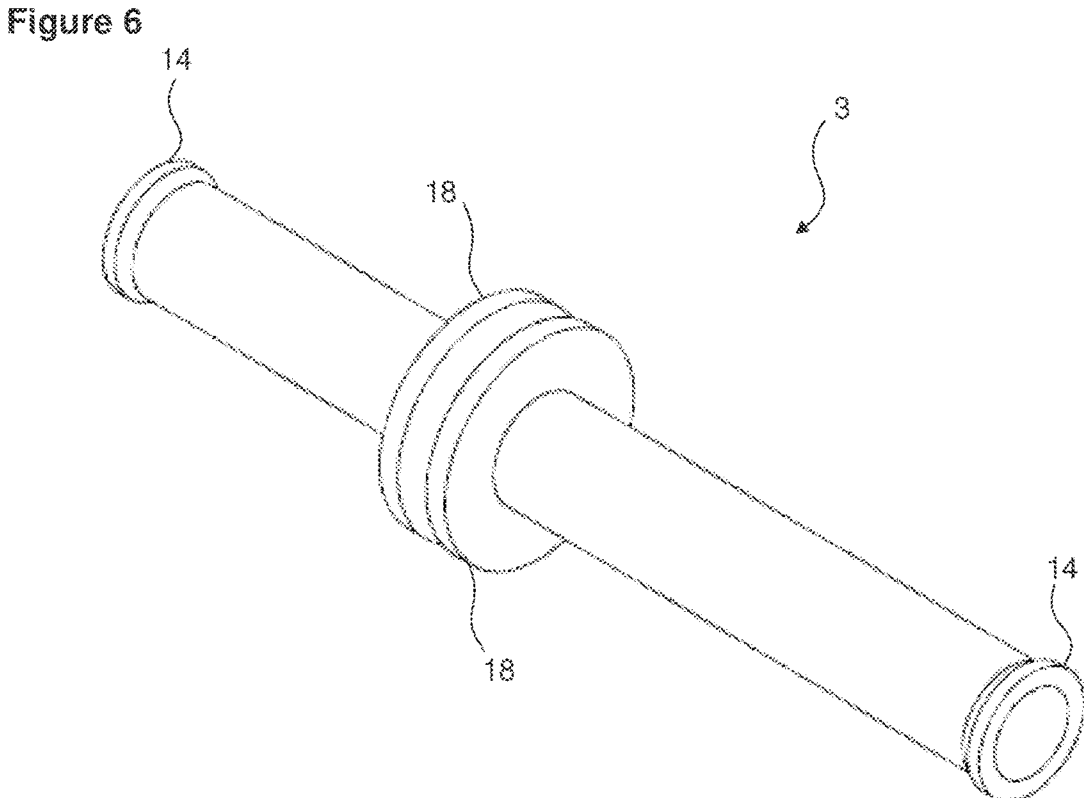
FIG. 6 is the general view of a stabilization rod.

In an embodiment of the present invention, the palatal and jaw expansion device (1) comprises a gradation (19) which is provided on each block (4) and whereon a protrusion (18) on the stabilization rod (3) and the first set (11) are seated in the closed position. In the embodiment of the present invention, the depth of the gradation (19) is at least equal to the thickness of the protrusion (18) and the first set (11). When fitted into the gradation (19), the protrusion (18) and the first set (11) flush the surface of the block (4) facing the movement mechanism (5). Thus, the opening capacity is increased, without increasing the size of the palatal and jaw expansion device (1), and the blocks (4) are enabled to move more on the stabilization rod (3) (FIG. 6).

Figure 5:
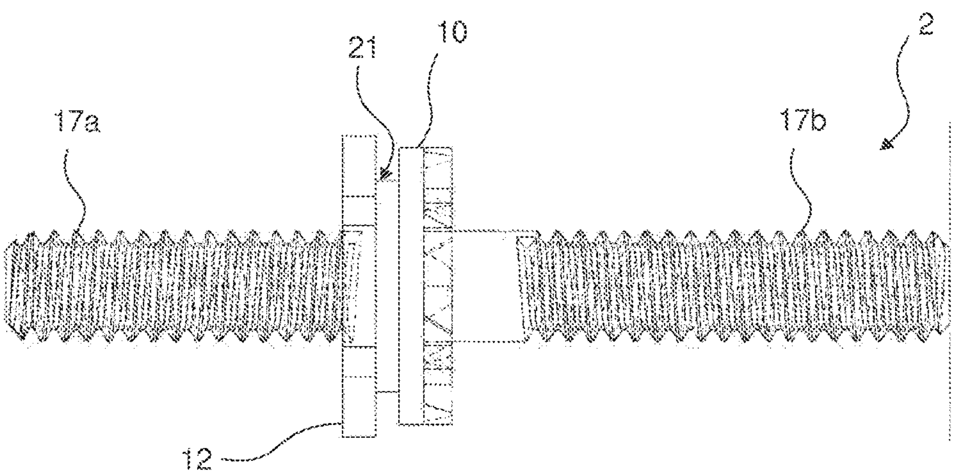
FIG. 5 is the general view of a screw.

The palatal and jaw expansion device (1) comprises screw threads (17*a*, 17*b*) bored on the screw (2) which is divided into two sections by the movement mechanism (5) in a direction on one side of the movement mechanism (5) and in reverse direction on the other side. The screw threads (17*a*, 17*b*) being bored in opposite directions provides that the blocks (4) placed on both sides of the screw (2) move so as to come closer to or move away from each other and hence that the palatal and jaw expansion device (1) is changed to the open or closed position. Thus, the blocks (4) on the screw (2) are enabled to move toward or away from the movement mechanism (5) at the same time. If one of the blocks (4) is moving toward the movement mechanism (5), the other also moves toward the movement mechanism (5). On the other hand, if one of the blocks (4) is moving away from the movement mechanism (5), the other also moves away (FIG. 5). In addition, there is a notch at both ends of the screw (2) that enables the screw (2) to be rotated from the outside by means of a screwdriver or other tool.

In the palatal and jaw expansion device (1), the movement mechanism (5) and the pushing member (13) are placed between the sections on the screw (2) where the screw threads (17*a*, 17*b*) are disposed. Thus, the first and second gearwheels (9 and 10) are enabled to be positioned so as to rotate around the screw (2). Moreover, the second gearwheel (10) is prevented from rotating freely with the screw (2) unless a force is applied by the first gearwheel (9).

Figure 10:
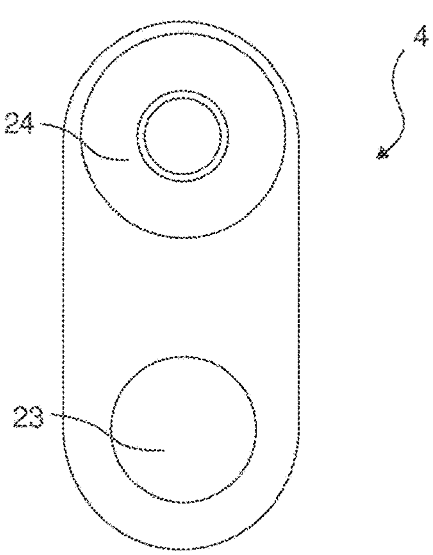
FIG. 10 is the general view of a block.

In an embodiment of the present invention, the palatal and jaw expansion device (1) comprises a first hole (23) on the block (4), wherein the stabilization rod (3) enters and a second hole (24) wherein the screw (2) enters (FIG. 10). The centers of the first hole (23) and the second hole (24) are coaxial. Moreover, grooves in matching form with the screw threads (17*a*, 17*b*) are bored on the inner surface of the second hole (24) wherein the screw (2) enters. While the block (4) slides over the stabilization rod (3) which enters the first hole (23), the screw (2) entering the second hole (24) moves in agreement with the threads (17*a*, 17*b*) thereon. In this embodiment of the present invention, the palatal and jaw expansion device (1) comprises the first stopper (14) which is provided on both ends of the stabilization rod (3), and a step (20) which is provided in the first hole (23), which narrows down the diameter of the first hole (23) and against which the first stopper (14) bears when the blocks (4) reach the maximum opening level. Thus, when the palatal and jaw expansion device (1) reaches the maximum opening level, the first stopper (14) and the step (20) hold onto each other, thus preventing the components forming the palatal and jaw expansion device (1) from disassembling even if rotated. Moreover, the palatal and jaw expansion device (1) in the patient's mouth is prevented from disassembling, and the patient is prevented from swallowing the components. In the preferred embodiment of the present invention, the first stoppers (14) provided at the ends of the stabilization rod (3) are obtained by applying pressure after all the components are assembled.

Moreover, in another embodiment of the present invention, the palatal and jaw expansion device (1) comprises a second stopper (22) which is provided on the second hole (24) surface next to the second set (12) and the first set (11). The second stopper (22) has a diameter larger than the diameter of the second hole (24), but does not have grooves thereon. Thus, when the palatal and jaw expansion device (1) reaches the maximum opening level, the screw (2) rotates freely in said grooveless second stopper (22) in the block (4), preventing the components forming the palatal and jaw expansion device (1) from disassembling and falling into mouth of the patient. Thus, the durability of the palatal and jaw expansion device (1) is increased while ensuring a safer use.

In the preferred embodiment of the present invention, a spring is used as the pushing member (13). In this embodiment, while the first gearwheel (9) is rotated by means of the arm (6), the pushing member (13) enables the first and second gearwheels (9 and 10) to interlock and move together. The pushing member (13) pushes the first gearwheel (9) toward the second gearwheel (10) and enables the first gearwheel (9) and the second gearwheel (10) to contact each other at all times and the teeth (25) to interlock.

Figure 11:
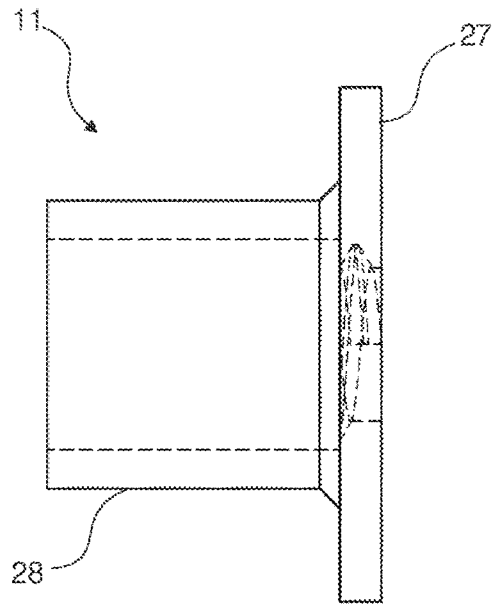
FIG. 11 is the sideways view of the first set.

In an embodiment of the present invention, the first set (11) has a stepped form, and comprises a headpiece (27) and a cylindrical pipe (28) which extends perpendicular to the headpiece (27) and is oriented coaxially with the screw (2), which surrounds the screw (2). The diameter of the headpiece (27) is larger than the diameter of the pipe (28) and forms a gradation on the pipe (28) (FIG. 11). In this embodiment, the first set (11) is fitted over the screw (2) by means of grooves. In the same embodiment, the palatal and jaw expansion device (1) comprises a housing (26) on the first gearwheel (9) surface facing the first set (11). While one end of the pushing member (13) bears against the headpiece (27) of the first set (11), the other end thereof is fitted into the housing (26) and surrounds the pipe (28) of the first set (11). In an embodiment of the present invention, the housing (26) has a graded form. Thus, space is saved.

Figure 12:
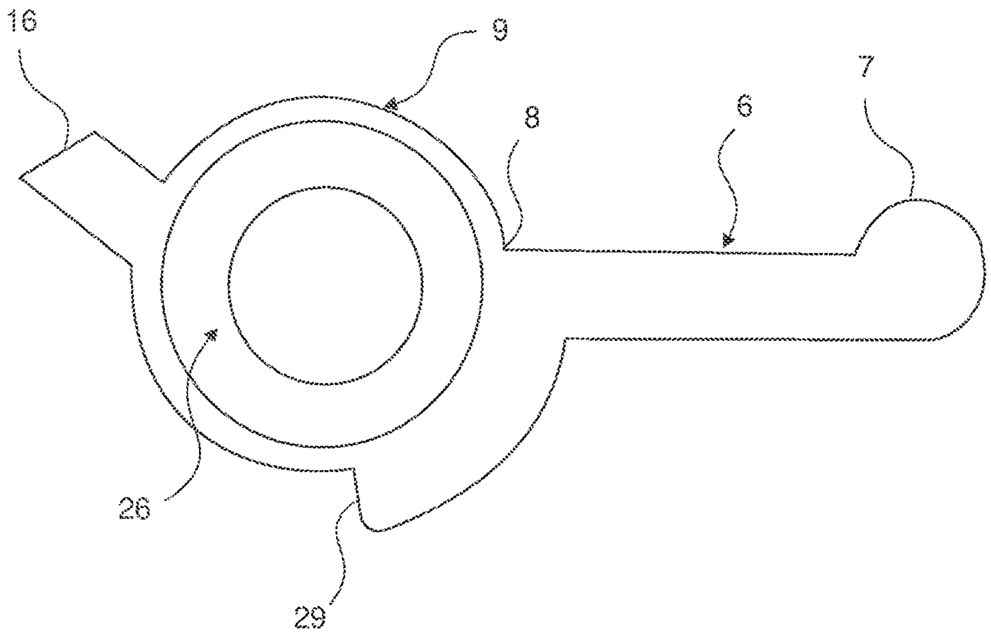
FIG. 12 is the view of the first gearwheel and the arm when assembled.

In an embodiment of the present invention, the first gearwheel (9) and the arm (6) are produced as a single piece. Thus, the risk of the arm (6) breaking is minimized. In this embodiment of the present invention, the palatal and jaw expansion device (1) comprises a third stopper (29) which is provided on the first gearwheel (9) at an approximately 90-degree angle with the arm (6). By means of the third stopper (29), the arm (6) is enabled to allow opening at the predetermined amount, preferably 0.2 mm (FIG. 12).

The palatal expansion device (1) comprises a claw (16) that is disposed on the movement mechanism (5), that prevents rotation of the arm (6) around the screw (2) freely, that enables the arm (6) to stay in the horizontal position inside the mouth, and that serves as a stopper.

The stabilization rod (3) is mounted to the blocks (4) in parallel with the screw (2). The stabilization rod (3) provides that the screw (2) is loosened comfortably against any unwanted pressures that may occur as the screw (2) is loosened and that the blocks (4) on the screw (2) move in a balanced and comfortable manner and that the screw (2) and the blocks (4) are kept together in a durable and rigid manner. The blocks (4) slide on the stabilization rod (3). The stabilization rod (3) serves as a guide for the blocks (4).

In an embodiment of the present invention, the free end (7) of the arm (6) is in the form of a semicircular knob. Thus, the arm (6) is enabled to be controlled more easily and conveniently. Moreover, the tongue is prevented from getting irritated.

Figure 13:
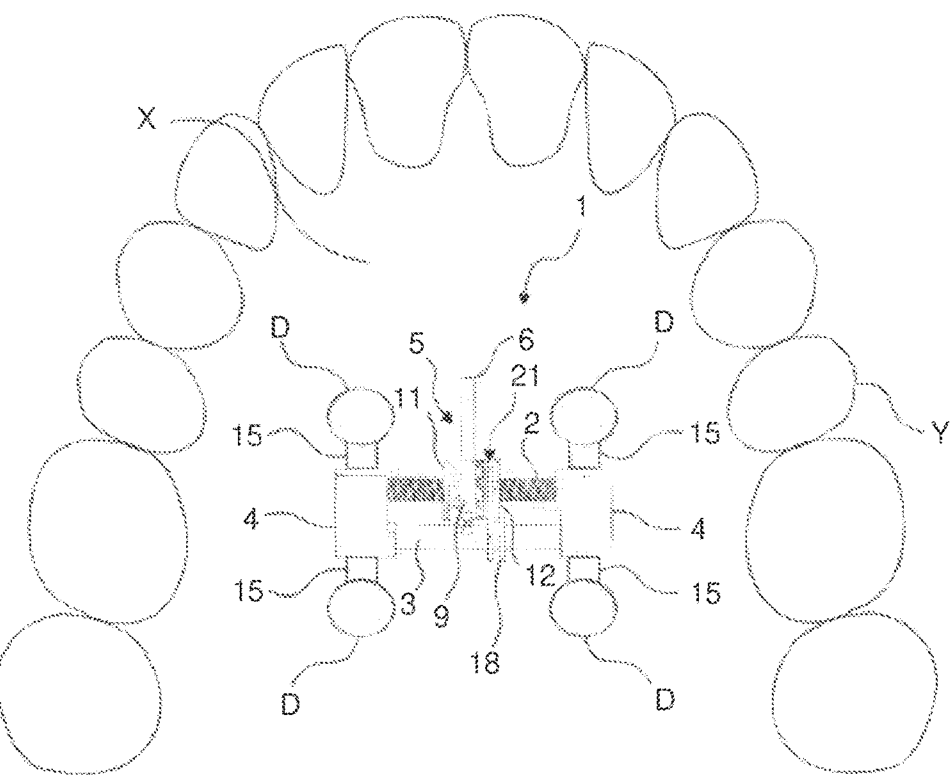
FIG. 13 is the view of the palatal and jaw expansion device attached to the palate.
Figure 14:
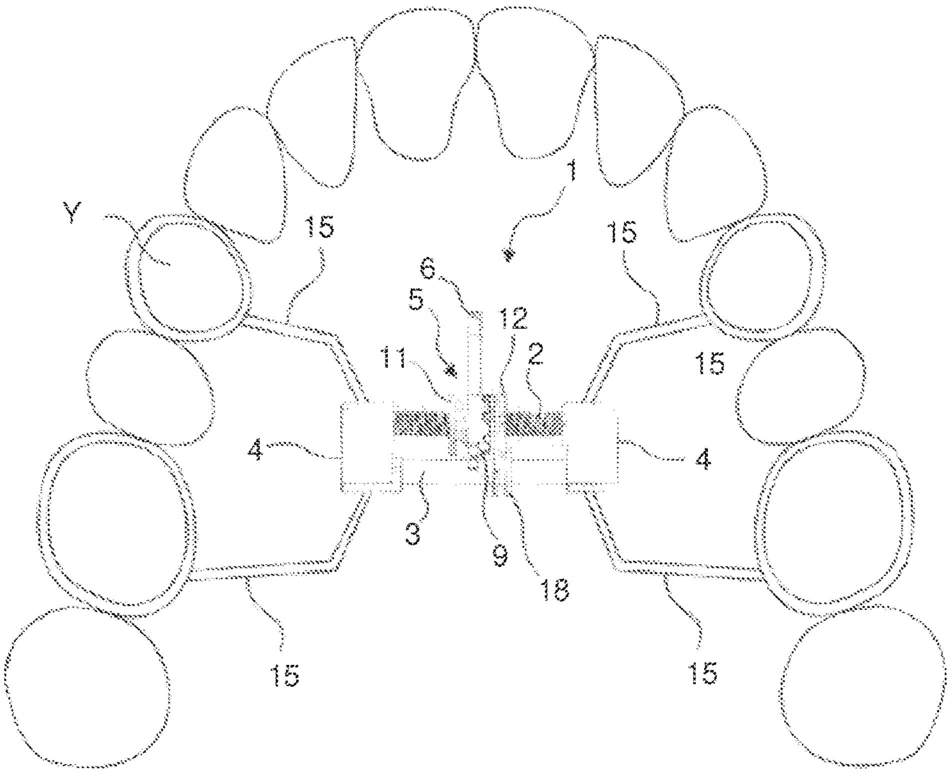
FIG. 14 is the view of the palatal and jaw expansion device attached to the teeth.

The palatal and jaw expansion device (1) of the present invention can be attached to the teeth (Y) and/or to the surface of the palate (X). The palatal and jaw expansion device (1) comprises minimum two and preferably four retaining wires (15), each of which is fixed to a block (4), one end on the block (4) and the other end on the molar bands, the teeth (Y) or the surface of the palate (X). In the preferred embodiment of the present invention, the retaining wires (15) are in the form of wire and are fixed on the block (4) preferably by means of a laser source, and in the embodiment where the retaining wires (15) are attached to the teeth (Y), rings are provided on the tips of the retaining wires (15) that are fitted onto the teeth (Y). In the version where the palatal and jaw expansion device (1) is fitted on the palate (X), miniscrews and implants (D) are provided on the tips of the retaining wires (15) and the palatal and jaw expansion device (1) is fixed on the surface of the palate (X) by means of the miniscrews and implants (D) (FIG. 13 and FIG. 14).

In the preferred embodiment of the present invention, the opening capacity of the palatal and jaw expansion device (1) is 10 mm. However, the opening capacity of the palatal and jaw expansion device (1) may vary depending on the needs of the doctor and the patient and can be adjusted linearly or gradually—e.g. as 8 mm, 12 mm or 14 mm, etc.

The invention claimed is:

1. A palatal and jaw expansion device comprising:

at least one screw;

at least two blocks, including a first end block and a second end block, that are positioned respectively on a first end and a second end of the screw to move on the at least one screw;

at least one stabilization rod on which the at least two blocks are also seated;

a movement mechanism disposed at the center of the screw;

an arm that has a fixed end fixed to the movement mechanism perpendicularly to a horizontal axis where the at least one screw extends, when force is applied on a free end, of the arm, it rotates the movement mechanism on which the arm is fixed and the screw around the horizontal axis where the screw extends, enabling the at least two blocks to move on the screw;

a first gearwheel that is disposed on the movement mechanism, whereon teeth in various profiles are bored, whereto the arm is fixed and that rotates on the screw around the horizontal axis by the movement of the arm; and a second gearwheel that is fixed on the screw, between the first gearwheel and the second end block, that completely contacts the first gearwheel to shift to an active position by the movement of the first gearwheel, and whereon teeth in matching form with the teeth on the first gearwheel are provided;

a first set and a second set that are disposed on the screw and that respectively limit the first and second gearwheels from both sides;

a channel which is provided between the second set and the second gearwheel;

two protrusions which are oppositely provided on the stabilization rod, which extend towards the movement mechanism and the screw, with one thereof being fitted into the channel and the other remaining between the second set and the second end block and a first stopper which is provided on both ends of the stabilization rod and that prevents the palatal jaw expansion device from disassembling.

2. The palatal and jaw expansion device as in claim 1, further comprising a gradation which is provided on each block and whereon the protrusions on the stabilization rod and the first set are seated in the closed position.

3. The palatal and jaw expansion device as in claim 2, wherein the gradation of the depth is at least equal to the thickness of the protrusion and the first set.

4. The palatal and jaw expansion device as in claim 1, wherein the teeth of the first and second gearwheels are sawtooth-shaped teeth.

5. The palatal and jaw expansion device as in claim 1, wherein the first and second gearwheels operate in a unidirectional manner.

6. The palatal and jaw expansion device as in claim 1, further comprising screw threads bored on the screw which is divided into two sections by the movement mechanism in a direction on one side of the movement mechanism and in a reverse direction on the other side.

7. The palatal and jaw expansion device as in claim 1, further comprising at least one pushing member that is disposed between the first gearwheel and the first set.

8. The palatal and jaw expansion device as in claim 1, further comprising a spring used as the pushing member.

9. The palatal and jaw expansion device as in claim 1, further a comprising:

a first hole on the first end block, wherein the stabilization rod enters and a second hole wherein the screw enters and which has grooves on the inner surface thereof in a matching form with screw threads of the screw; and a step which is provided in the first hole, which narrows down the diameter of the first hole and against which the first stopper bears when the at least two blocks reach the maximum opening level.

10. The palatal and jaw expansion device as in claim 1, further comprising a second stopper which is provided on the second hole surface next to the second set and the first set.

11. The palatal and jaw expansion device as in claim 10, wherein the second stopper which has a diameter larger than a diameter of the second hole, but does not have grooves thereon.

12. The palatal and jaw expansion device as in claim 1, wherein the first set has a stepped form, the first set comprising:

a headpiece, and a cylindrical pipe which extends perpendicular to said headpiece and coaxially with the screw and which surrounds the screw.

13. The palatal and jaw expansion device as in claim 12, further comprising a housing on the first gearwheel surface facing the first set, wherein while one end of a pushing member bears against the headpiece thereof, another end thereof is fitted into the housing and surrounds the pipe thereof.

14. The palatal and jaw expansion device as in claim 1, further comprising a claw that is disposed on the movement mechanism, that prevents rotation of the arm around the screw freely, that enables the arm to stay in the horizontal position inside the mouth, and that serves as a stopper.

15. The palatal and jaw expansion device as in claim 10, further comprising a third stopper which is provided on the first gearwheel at an approximately 90-degree angle with the arm.

* * * * *